US006539169B1

(12) United States Patent
Tsubaki et al.

(10) Patent No.: US 6,539,169 B1
(45) Date of Patent: Mar. 25, 2003

(54) METHOD AND APPARATUS FOR RECORDING AND RE-RECORDING IMAGE DATA IN A DEVICE HAVING LIMITED MEMORY CAPACITY

(75) Inventors: Hisayoshi Tsubaki, Saitama-ken (JP); Hiroshi Tanaka, Saitama-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/219,451

(22) Filed: Dec. 23, 1998

(30) Foreign Application Priority Data

Dec. 25, 1997 (JP) ............................................... 9-358140

(51) Int. Cl.⁷ ............................ H04N 5/76; H04N 5/225
(52) U.S. Cl. ..................... 386/109; 386/111; 386/117; 348/231.2; 348/231.3
(58) Field of Search .............................. 386/1, 33, 38, 386/45, 46, 95, 52, 64, 111–112, 125–126, 117–120, 109; 348/231, 232, 233, 231.1, 231.2, 231.3; 358/906, 909.1; H04N 5/76, 5/92, 9/79, 5/225

(56) References Cited

U.S. PATENT DOCUMENTS 5,764,800 A * 6/1998 Yamagata .................... 348/231

6,263,106 B1 * 7/2001 Yamagata .................... 382/232
6,298,194 B1 * 10/2001 Takahashi ..................... 386/46

FOREIGN PATENT DOCUMENTS

JP     A-1-081583     3/1989

* cited by examiner

Primary Examiner—Thai Tran
(74) Attorney, Agent, or Firm—Birch, Stewart, Kolasch & Birch, LLP

(57) ABSTRACT

In the case where images photographed by a digital camera or the like are recorded in a recording medium at a predetermined resolution or compression rate upon photographing and the data representing the image are re-recorded therein after being read and resolution-converted or re-compressed, a target of re-recording can be specified by a simple operation and damage due an erroneous input can be minimized. A function is provided for setting accompanying information such as necessity of printing an image when the image is being replayed in a replay mode, for example. The information having been set is described in a tag of an image file and recorded together with the image. When a user shifts a mode to a re-recording execution mode, necessity of re-recording is judged based on the stored information having been set. A re-recording target image file is then read from a memory card and re-recorded therein after a resolution conversion or compression processing carried out on the image data.

18 Claims, 3 Drawing Sheets

METHOD AND APPARATUS FOR RECORDING AND RE-RECORDING IMAGE DATA IN A DEVICE HAVING LIMITED MEMORY CAPACITY

BACKGROUND OF THE INVENTION

1. Field of the Invention

The present invention relates to an image recording function of a digital camera, and more specifically to a method of efficiently using a recording medium for a digital camera having a limited memory capacity.

2. Description of the Related Art

For a digital camera which records photographed images as digital data in its memory, the number of photographs which can be recorded depends on the capacity of the memory. Specifically, in the case where a built-in memory of a digital camera becomes full, subsequent photographing cannot be carried out without transferring image data in the memory thereof to a personal computer or the like. Therefore, many digital cameras have a function to switch image recording modes according to a purpose of photographing so that their memories can be used as efficiently as possible. More specifically, many cameras have plural kinds of recording modes such as a high quality (high resolution) mode or a compression mode, according to the resolution or necessity of compression of an image.

For digital cameras currently available on the market, such a recording mode needs to be set before photographing, and for image data having been recorded in a memory, the recording mode cannot be changed. However, the purpose of photographing (the usage of images) is not obvious in many cases upon photographing.

For example, in order to print a photographed image, the image needs to be recorded in a high quality (high resolution) mode. However, whether or not an image is printed has not necessarily been decided before photographing the image, and it is often decided after the image is checked to see how it has come out. In such a case, since all images can be candidates for printing, the recording mode should be set to the high quality mode for all images at the time of photographing. In other words, many users record even images only requiring compression-mode quality (which are not printed) in the high quality mode.

As means to solve this problem, Japanese Unexamined Patent Publication No. 64(1989)-81583 discloses a digital camera having a function to read image data having been temporarily recorded in a memory and to re-record the data after compression thereof. When the frame number of an image to be compressed is input from an input circuit of this digital camera, a driving circuit thereof generates a timing signal for reading the image data and gives an instruction to another system. Based on this instruction, the image data are read from the memory card and compressed. The compressed image data are then re-recorded in the memory card. According to this digital camera, the necessity of printing is decided after photographing and re-recording of the image whose printing is not necessary is carried out after compression thereof, for example. In this manner, memory space for further photographing can be saved.

In order to save the memory space, a user has to select some images which may be re-recorded, that is, images whose quality does not cause a problem if it is degraded to some degree. However, in the case where a user wishes to record all images in high quality if possible, for example, it is natural for the user to select the least necessary number of images which will be compressed to compensate for the memory space to be saved. In such a case, the user has to select the images to be compressed, which seem to have comparatively low quality, by comparing each image to the other images recorded in the memory.

More specifically, the user sequentially confirms the images having been recorded and selects candidates for the images to be compressed. After confirmation of all images, if the number of the selected images is smaller than that of the images necessary to save the memory space, the same procedure is repeated. If the former is larger than the latter, the user cancels the selection of some images. In another case, a user has selected one image to be compressed and may wish to cancel the selection after browsing the other images. In other words, it is common for users to select images to be compressed by trial and error.

The digital camera disclosed in the Japanese Unexamined Patent Publication No. 64 (1989)-81583 immediately carries out the compression and re-recording processing once the number of an image to be compressed has been input. Therefore, compression cannot be canceled after the number has been input. As a result, a user needs to select the images to be compressed by trial and error while taking notes for example, and only the frame number of the image having been confirmed as a compression target should be input to the digital camera.

However, the above-described re-recording procedure needs to be carried out hastily in order to save the memory space for subsequent photographing, and it is not desirable for a user to carry out troublesome processing while taking notes, for example. Furthermore, the user has a risk of inputting an erroneous number due to the hasty processing. Therefore, the manner of re-recording where cancellation of an input is not possible is undesirable.

SUMMARY OF THE INVENTION

Based on consideration of the above problems, an object of the present invention is to provide a method and a digital camera which allow users to specify a re-recording target by trial and error while carrying out a simple operation and to minimize damage due to an erroneous specification, whereby images are recorded efficiently in a memory.

In order to solve the above problems, the present invention stores, in a memory, a temporary specification of a re-recording target input by a user during the trial and error process, and carries out the re-recording processing collectively by referring to the temporary specification at the time a predetermined operation is carried out.

In other words, an image re-recording method of the present invention records data representing at least one image obtained by photographing in a recording medium;

stores accompanying information received with regard to the data of each image having been recorded, by relating the accompanying information to the image data;

judges, based on the accompanying information, whether or not the data of each image are re-recorded as data having a smaller data size when a predetermined operation is carried out;

sequentially reads image data to be re-recorded from the recording medium, based on the judgment;

carries out conversion processing such that the size of image data becomes smaller than the image data having been read; and re-records the image data after the conversion in the recording medium.

As the "conversion processing", a resolution conversion to lower the resolution, compression processing such as compression to a JPEG format file, or a combination of the resolution processing and the compression processing are possible, for example. Alternatively, the resolution conversion and the compression processing may have several levels according to the resolution and the compression rates respectively. In this case, the level of the resolution or the compression rate is judged upon the judgment of re-recording necessity, and the conversion processing may be carried out according to the level. "Re-recording" may be carried out by writing the converted data over the original image data. Alternatively, it may be carried out by recording the converted image data in an area different from that of the original data and erasing the original image data from the recording medium thereafter. If the original image data are erased after re-recording, the timing of erasing the original data may be decided by a user. Alternatively, the original data may be erased automatically after a predetermined time has elapsed.

The "accompanying information" may directly specify the necessity of re-recording. Alternatively, the accompanying information may indicate the necessity of printing image data, the content of printing, and the degree of importance of an image, for example. In other words, according to a general judgment criterion, if the information indicates the necessity of printing, re-recording is judged to be unnecessary, since high resolution is necessary for printing. On the contrary, if the information indicates no necessity of printing, re-recording is judged to be necessary. Alternatively, the necessity of re-recording may be judged based on the detailed content of the information regarding printing. For example, when enlargement printing has been specified as a portion of the content of printing, no re-recording occurs. When standard size printing has been specified, re-recording at a comparatively low compression rate is carried out. When no printing has been specified, compression at a comparatively high compression rate is carried out for re-recording. However, the present invention does not limit the judgment criterion to those examples, and the judgment is carried out according to a predefined judgment criterion. "To store accompanying information . . . by relating the accompanying information to the image data" means insertion of the accompanying information into the header of the image file wherein the image data are recorded. Alternatively, a file describing the relationship between the frame number of an image and the accompanying information thereof may be generated separately from image data files.

The "predetermined operation" may be an operation which requests execution of the re-recording processing directly or indirectly. In other words, the re-recording processing may be carried out by a user's pressing a re-recording processing execution button or the like provided for that purpose. Alternatively, an operation which has been carried out for another purpose, such as pressing a printing target confirmation button, may be interpreted as a request for the re-recording processing execution.

An image recording apparatus of the present invention re-records an image according to the above method, and comprises:

photographed image recording means for recording data representing at least one image obtained by photographing in a recording medium;

accompanying information recording means for storing accompanying information received with regard to the data of each image having been recorded, by relating the accompanying information to the image data;

re-recording necessity judging means for judging, based on the accompanying information, whether or not the data of each image are re-recorded as data having a smaller data size when a predetermined operation is carried out;

data reading means for reading image data to be re-recorded from the recording medium, based on the judgment;

data converting means for carrying out conversion processing such that the size of image data becomes smaller than the image data having been read; and re-recording means for re-recording the image data after the conversion in the recording medium.

The image recording method and apparatus of the present invention temporarily store the accompanying information and do not carry out the re-recording processing at the time the accompanying information regarding re-recording target selection is input by a user. When the predetermined operation is carried out, the re-recording processing is executed collectively. In this manner, the user can select the re-recording target as many times as he/she wishes before the predetermined operation is carried out. Therefore, a temporary decision can be input and an erroneous input can be corrected. When the temporary decision becomes the final one, the information has already been input and the re-recording processing is carried out immediately by a simple button operation or the like carried out by the user.

For example, memory space can be saved by re-recording an image which is for display only and has no necessity of printing at a lower resolution to reduce the data size thereof. When printing is necessary, or when the memory space is still insufficient even after re-recording at a lower resolution has been carried out, the memory space can be saved by re-recording image data after compression thereof according to the JPEG format or the like.

Upon re-recording, if an image file is overwritten using the same file name, re-recording can be carried out with certainty and without a problem even when the memory is full. Meanwhile, when the memory has some free space, an image file may be written as another file without being overwritten so that the original image data can be recovered in the case of re-recording due to an erroneous operation.

If the decision as to whether re-recording is carried out or at which resolution or compression rate it is carried out is decided automatically based on the necessity of printing or the print size input by a user, the user can save the memory space by compressing an appropriate image at an appropriate compression level even if the user does not have special knowledge of resolution or compression rates.

DESCRIPTION OF THE PREFERRED EMBODIMENT

Hereinafter, as an embodiment of the present invention, a digital camera which re-records an image according to a method of the present invention will be explained. The digital camera comprises a liquid crystal monitor and records image data obtained by photographing in a memory card which is detachable from the digital camera. The image data can be recorded at two resolutions, namely a standard resolution and a high resolution. Before photographing, a user can select the resolution used in recording.

An operation of this digital camera is carried out in 3 operation modes. One is a photographing mode in which image data obtained by photographing are recorded in the memory card as they are. Another is a replay mode wherein images recorded in the memory card are replayed on the monitor one by one. The other is an erasing mode wherein an image selected from the images recorded in the memory card or all images therein are erased and the memory card is formatted upon necessity.

In the replay mode, accompanying information such as necessity of re-recording can be set. Furthermore, a re-recording execution mode is provided separately from the above-described 3 modes.

Figure 1:
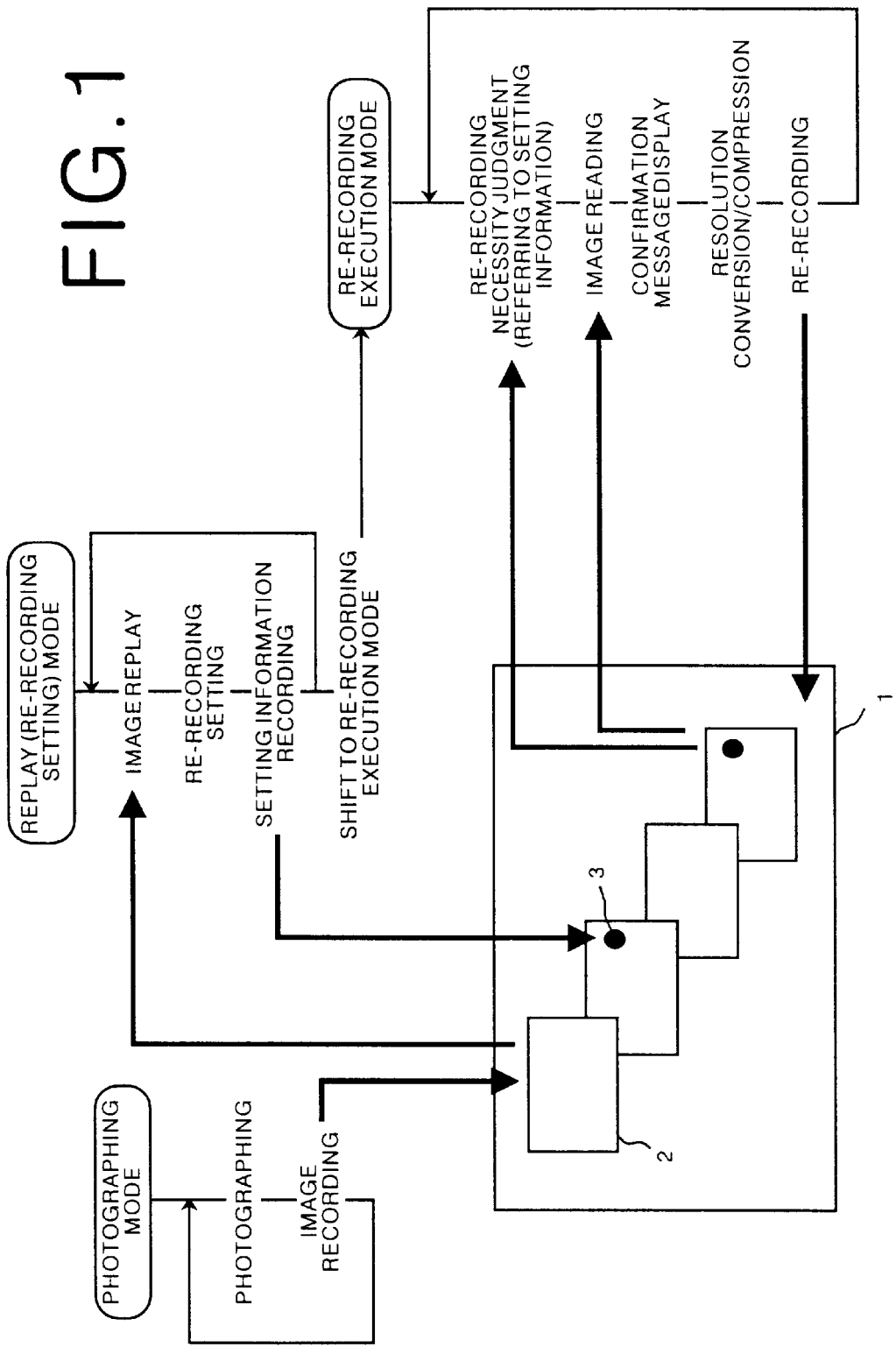
FIG. 1 is a diagram showing an outline of an image recording method of the present invention.

FIG. 1 shows processing by the digital camera in the photographing mode, replay mode, and re-recording execution mode, with attention being paid to reading or writing of data from or to a memory card 1.

In the photographing mode, image data are obtained by photographing and obtained image data 2 are recorded in the memory card 1 in the same manner as by a conventional digital camera. At this time, information showing the photographing order (the frame number), the time and date of photographing, and the like is recorded together with the data representing the image. Image data 2 obtained by subsequent photographing are recorded in the memory card 1 in the same manner as described above, and this processing is repeated at each photographing.

In the replay mode, the image data 2 having been recorded in the memory card 1 in the photographing mode are read from the memory card and replayed on the liquid crystal monitor as a visible image. At this time, a frame number 4, a resolution 5 at the time of photographing, the time and date 6 of recording, and the like are shown on the monitor together with the image, as shown in FIG. 2, for example.

Figure 2:
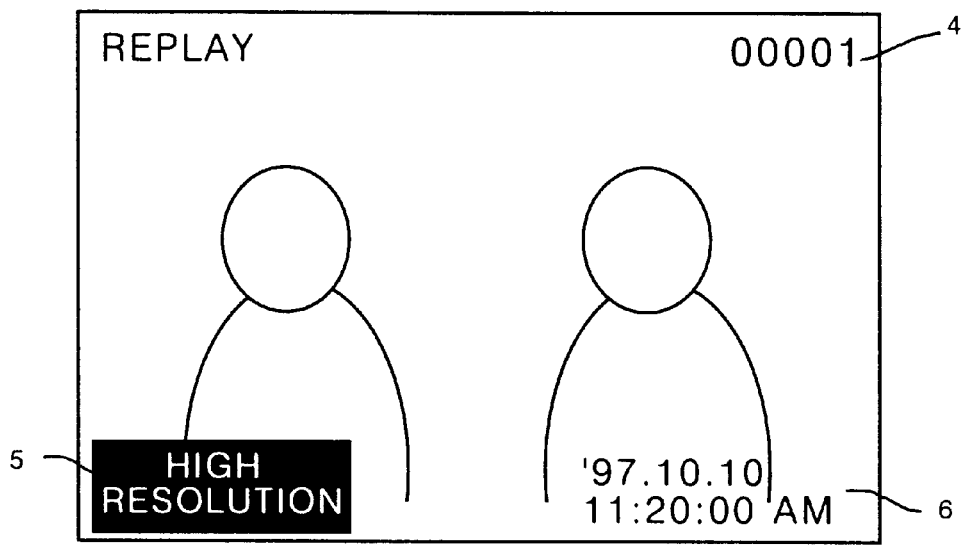
FIG. 2 is a diagram showing an example of a replay mode screen.
Figure 3:
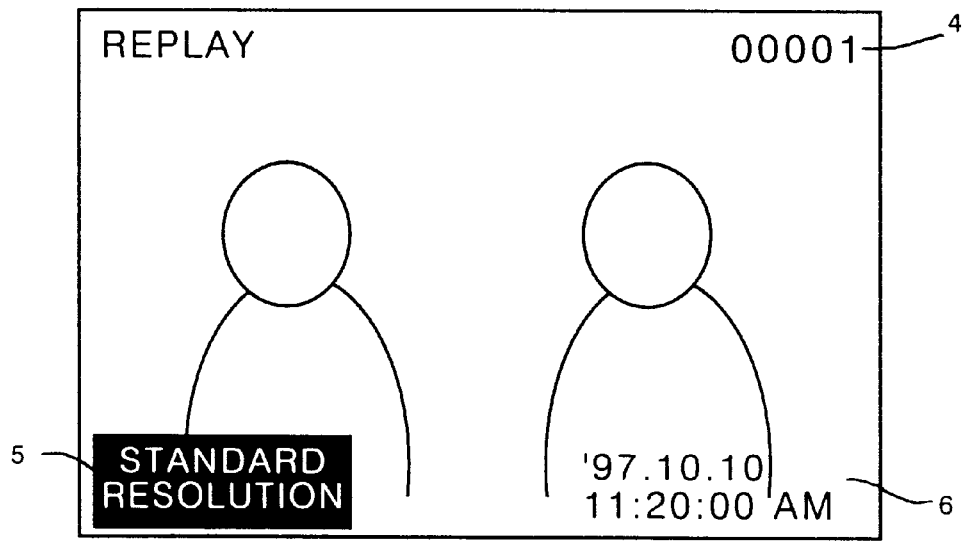
FIG. 3 is a diagram showing an example of a screen on which re-recording is specified.

A user can specify re-recording on the screen shown in FIG. 2. This re-recording setting is carried out by changing the resolution level being displayed, which has been set at the time of recording, to another resolution level by a predetermined button operation, for example. When this resolution changing operation is carried out, the screen shown in FIG. 2 becomes the screen shown in FIG. 3, for example. However, only the display of the resolution level is changed at this time, and the resolution of the image data recorded in the memory card is maintained at a high level.

In this embodiment, when the re-recording setting is carried out, a re-recording setting flag 3 described in the image file 2 is set to ON. However, the method of recording the information showing the re-recording setting is not limited to this example. Another method is possible wherein a re-recording setting flag is recorded in relation to the frame number in a temporary storage memory in the camera, instead of the memory card, for example.

The user can select an image to be re-recorded by sequentially replaying the image and repeating the procedure described in the above. In order to cancel the re-recording setting during the selection process, the display of the resolution level is changed to the previous level. In this case, the flag is set to OFF at the time the cancellation operation is carried out.

The user presses a re-recording button (this button may be substituted by a shutter button or the like) at the time re-recording target selection has been finished. By this operation, the operation mode shifts to the re-recording execution mode. However, the shift to the re-recording execution mode is possible from a mode other then the replay mode.

In the re-recording execution mode, the re-recording setting flag 3 recorded in the image file 2 in the memory card 1 is referred to, and the necessity of re-recording is judged for each image. Image data representing an image which has been judged to be a re-recording target are read from the memory card 1 and the image data are loaded in the temporary storage memory for data processing.

Figure 4:
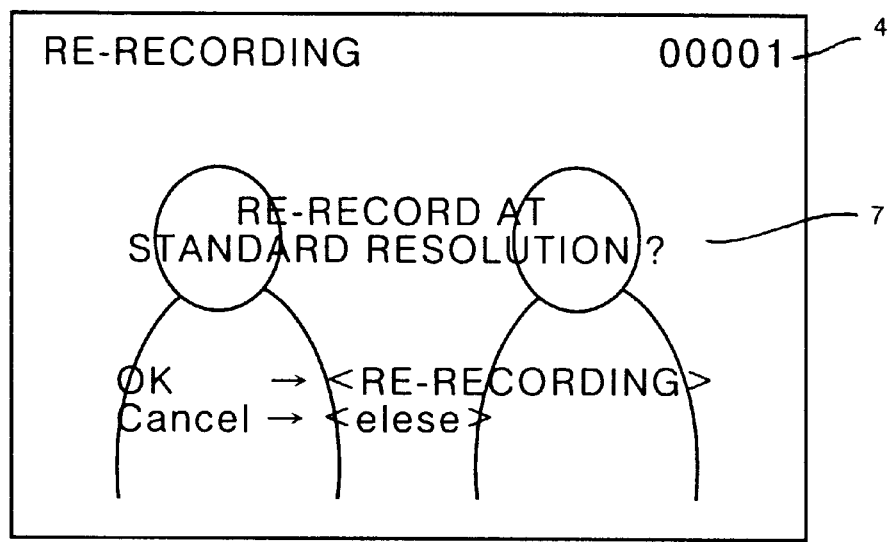
FIG. 4 is a diagram showing an example of a re-recording execution mode screen.

In this embodiment, as shown in FIG. 4 for example, the image data having been read are displayed on the monitor in addition to a confirmation message for re-recording processing, and a resolution conversion and the processing for re-recording the image data in the memory card is carried out when the user presses the re-recording button. When a button other than the re-recording button is pressed, the re-recording setting is canceled.

When re-recording is canceled or completed, a subsequent frame whose re-recording has been specified is displayed together with the confirmation message. The user can re-record all images which have been set in the replay mode as the images needing re-recording at a resolution lower than that of the original images, by pressing the re-recording button while sequentially confirming the images. However, in this embodiment, this confirmation message is not absolutely necessary and all images which have been set as re-recording target may be re-recorded unconditionally after a resolution conversion carried out thereon, upon the shift to the re-recording execution mode.

In the above embodiment, re-recording is carried out after converting the resolution from a higher one to a standard one. However, memory space may be saved by re-recording image data after changing the compression rate applied thereto.

The resolution or the compression rate may be classified in a plurality of levels. In such a case, the resolution or the compression rate to be applied may be described as a portion of re-recording setting information, together with the flag indicating the necessity of re-recording.

The necessity of re-recording may be judged automatically based on a printing specification carried out by the user, rather than the direct specification of re-recording necessity by the user as in the above embodiment.

Figure 5:
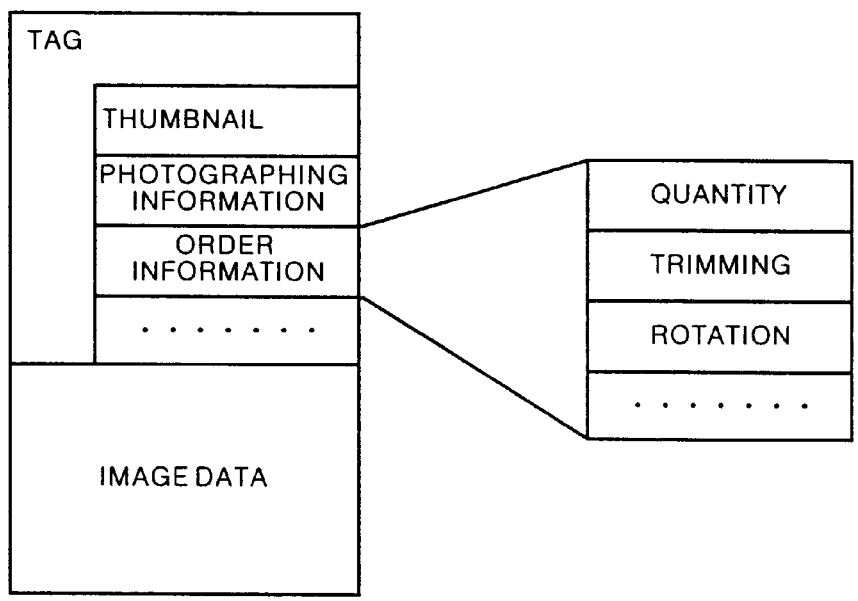
FIG. 5 is a diagram showing an example of an image file whose tag contains order information.

For example, the necessity of printing, the quantity and the size of prints or the like can be specified by the user in the replay mode by using a digital camera having a printing specification function or a digital camera having a function to place an order from a laboratory which is now becoming popular. The information having been specified is described in a tag or the like of the image file, as shown in FIG. 5 for example.

Therefore, necessity of printing may be judged automatically based on the printing specification information (order information), and re-recording may be carried out thereafter. For example, for an image which needs printing, especially in an enlargement size, the image is judged to be desirable if recorded in high quality. Therefore, an image which does not need printing is re-recorded after being compressed at a high compression rate, while an image which needs printing in a standard size is re-recorded at a comparatively low compression rate. On the other hand, for an image which needs printing in an enlargement size, re-recording is not carried out.

Furthermore, re-recording may be carried out by automatically judging the necessity of re-recording based on various kinds of accompanying information input by the user, such as the degree of importance of an image. In this case, the user simply sets the accompanying information without considering resolution or a compression rate, and he/she only has to switch to the re-recording mode when memory space is needed.

What is claimed is:

1. An image re-recording method comprising the steps of:

recording data representing at least one image obtained by photographing in a recording medium;

storing accompanying information received with regard to the data of each image having been recorded, by relating the accompanying information to the image data;

changing the accompanying information stored, as desired;

judging, based on the accompanying information, whether or not the data of each image are re-recorded as data having a smaller data size when a predetermined operation is carried out;

reading image data to be re-recorded sequentially from the recording medium, based on the judgment;

carrying out conversion processing such that the size of image data becomes smaller than the image data having been read; and collectively re-recording the image data after the conversion in the recording medium.

2. An image recording method as claimed in claim 1 wherein a resolution conversion is carried out as the conversion processing.

3. An image recording method as claimed in claim 1 wherein compression processing using coding is carried out as the conversion processing.

4. An image recording method as claimed in claim 1 wherein the re-recording is carried out by writing the data after the conversion over the original image data.

5. An image recording method as claimed in claim 1 wherein the re-recording is carried out by recording the data after the conversion in an area different from that of the original image data and erasing the original image data from the recording medium thereafter.

6. An image recording method as claimed in claim 1 wherein the accompanying information indicates whether re-recording of the image data is necessary or unnecessary.

7. An image recording method as claimed in claim 1 wherein the accompanying information indicates whether printing of the image data is necessary or unnecessary; and re-recording is judged to be unnecessary in the judgment if printing is necessary, while re-recording is judged to be necessary if printing is unnecessary.

8. An image recording method as claimed in claim 1 wherein the accompanying information is information showing the content of printing of the image data; and the judgment is carried out based on the content of printing.

9. The image re-recording method according to claim 1, wherein the accompanying information is inserted into the header of the image data.

10. An image re-recording apparatus comprising:

photographed image recording means for recording data representing at least one image obtained by photographing in a recording medium;

accompanying information recording means for storing accompanying information received with regard to the data of each image having been recorded, by relating the accompanying information to the image data, the accompanying information recording means capable of changing the stored information, as desired;

re-recording necessity judging means for judging, based on the accompanying information, whether or not the data of each image are re-recorded as data having a smaller data size when a predetermined operation is carried out;

data reading means for reading image data to be re-recorded from the recording medium, based on the judgment;

data converting means for carrying out conversion processing such that the size of image data becomes smaller than the image data having been read; and re-recording means for collectively re-recording the image data after the conversion in the recording medium.

11. An image recording apparatus as claimed in claim 10 wherein the data converting means carries out a resolution conversion.

12. An image recording apparatus as claimed in claim 10 wherein the data converting means carries out compression using coding.

13. An image recording apparatus as claimed in any one of claim 10 wherein the re-recording means carries out the re-recording by writing the data after the conversion over the original image data.

14. An image recording apparatus as claimed in any one of claim 10 wherein the re-recording means carries out the re-recording by recording the data after the conversion in an area different from that of the original image data and erasing the original image data from the recording medium thereafter.

15. An image recording apparatus as claimed in claim 10, characterized by that the accompanying information indicates whether re-recording of the image data is necessary or unnecessary.

16. An image recording apparatus as claimed in claim 10, characterized by that the accompanying information indicates whether printing of the image data is necessary or unnecessary; and the re-recording necessity judging means judges that re-recording is unnecessary if printing is necessary or that re-recording is necessary if printing is unnecessary.

17. An image recording apparatus as claimed in claim 10, characterized by that the accompanying information is information showing the content of printing of the image data; and the re-recording means judges the necessity of re-recording based on the content of printing.

18. The image re-recording apparatus according to claim 10, wherein the accompanying information is inserted into the header of the image data.

* * * * *